April 23, 1957 M. J. DE LUCIA ET AL 2,790,155
TIRE AIR PRESSURE SIGNAL MECHANISM
Filed Feb. 28, 1955 2 Sheets-Sheet 1
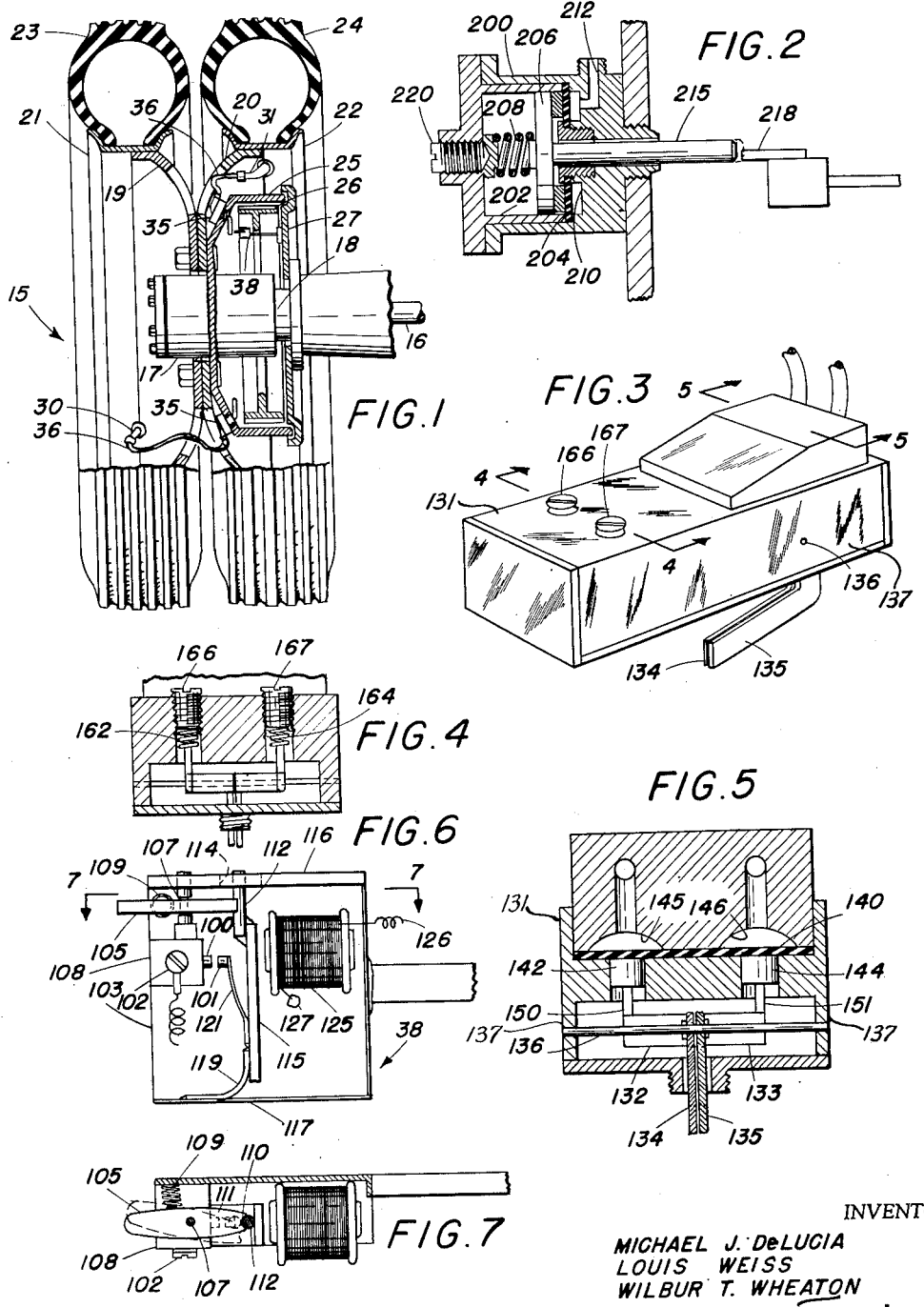
INVENTOR
MICHAEL J. DeLUCIA
LOUIS WEISS
WILBUR T. WHEATON
BY Toulmin & Toulmin
ATTORNEYS April 23, 1957 M. J. DE LUCIA ET AL 2,790,155
TIRE AIR PRESSURE SIGNAL MECHANISM
Filed Feb. 28, 1955 2 Sheets-Sheet 2

INVENTOR
MICHAEL J. De LUCIA
LOUIS WEISS
WILBUR T. WHEATON

BY *Toulmin & Toulmin*

ATTORNEYS

United States Patent Office 2,790,155
Patented Apr. 23, 1957

2,790,155

TIRE AIR PRESSURE SIGNAL MECHANISM

Michael J. De Lucia, Buffalo, Louis Weiss, Williamsville, and Wilbur T. Wheaton, Clarence Center, N. Y.

Application February 28, 1955, Serial No. 490,748

5 Claims. (Cl. 340—58)

This invention relates generally to signal mechanism, and more particularly to signal means for indicating the under-inflation or deflation of pneumatic tires, such as commonly used on motor vehicles for example passenger cars, buses, trucks, trailers, aircraft, and the like and which are equipped with pneumatic tires. The invention is especially useful in connection with multiple-tire installations, e. g. dual tire wheels, as conventionally used on trucks and trailers.

It is known that the life of a pneumatic tire may be shortened and its usefulness seriously impaired by running the tire under-inflated or in deflated condition. An under-inflated tire wears out much faster than a tire inflated to its proper pressure. In the case of trucks equipped with dual tire installations, the under-inflation or deflation of one of the tires generally goes unnoticed for some time inasmuch as the load is supported on the other tire. Continued use of dual tire wheels with one or both tire casings under-inflated results in damage to the under-inflated tire as well as to the adjacent properly inflated tire. Injury to the latter is brought about through the repeated bulging and transverse flexing of the under-inflated tire which brings it into contact with the side walls of the adjacent tire of the dual mounting. Where this condition is allowed to continue the side wall of the tire breaks down which often results in a blowout.

The present invention provides a signal attachment mechanism which is readily installed on pneumatic tired vehicles, and which operates to signal the driver when a tire is under-inflated. The signal device of the invention is especially useful on truck tire installations of the dual type, and in its preferred form provides signal means on the instrument of the car whereby the operator is warned of any under-inflated tire on the vehicle so that the same can be attended to before any damage is done.

It is an object of the invention to provide a signal attachment for pneumatic tire installations, either single or multiple, and which is operable to warn the operator by means of a signal light whenever any tire on the vehicle reaches a predetermined under-inflated condition.

Another object of the invention is to provide a signal attachment which is operable in response to a drop in air pressure in a pneumatic tire, the attachment being of simple and sturdy construction and easily connected for operation on automobiles, buses and trucks.

Another object of the invention is to provide a signal mechanism which is readily mounted on conventional dual tire truck installations for signalling the under-inflation or deflation of one or more tires on the vehicle and its location.

Another object of the invention is to provide an attachment of the character described for signalling under-inflation of a pneumatic tire on a dual wheel installation, the attachment comprising an electrically operated signal means which is actuated by a pressure responsive means connected to the tire.

Another object of the invention is to provide signal mechanism which is of simplified construction and which may be readily mounted on a dual tire wheel and operated to display a signal upon under-inflation or deflation of either of the dual tires.

Another object of the invention is to provide a pressure responsive signalling device which operates to display a warning signal on the instrument panel of the vehicle when any one of the tires on the vehicle becomes under-inflated.

The present invention, although particularly useful in dual tire installations, is likewise applicable for like use on vehicles equipped with pneumatic tires of the single casing type, and such as commonly employed on trucks, passenger cars, and buses.

Other objects and advantages of the invention will be apparent to those skilled in the art from the following description taken in connection with the accompanying drawings forming a part of this specification.

In the drawings:

Figure 1 illustrates a dual tire structure embodying the signalling attachment of this invention, the structure being broken away and shown partly in section in the interest of clearness;

Figure 2 is a sectional view illustrating a modified pressure responsive means for operating the switch means to display the signal when under-inflation of a tire takes place;

Figure 3 is a perspective view of a modified form of pressure responsive means as utilized on a dual tire wheel structure;

Figure 4 is a sectional view taken substantially on the line 4—4 of Figure 3 and looking in the direction of the arrows;

Figure 5 is a similar sectional view taken on the line 5—5 of Figure 3 and looking in the direction of the arrows;

Figure 6 is a detailed plan view of the switch mechanism illustrated in Figures 1 and 9 and drawn on an enlarged scale;

Figure 7 is a view taken on the line 7—7 of Figure 6 and looking in the direction of the arrows;

Figure 8:
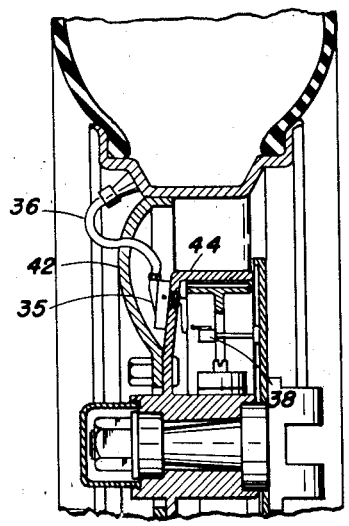
Figure 8 is a detailed sectional view taken through a tire wheel structure and illustrating the means of attaching the signal operating mechanism to the pneumatic tire; parts of the tire and wheel mechanism being shown broken away.

Referring to the drawings, and more particularly to Figures 1, 6 to 9, there is illustrated a preferred signal attachment mechanism for pneumatic tires, and more especially as used on dual tire wheels.

Referring to Figure 1, the dual tire wheel structure 15 comprises an axle 16, and hub structure 17 carried on the axle housing as at 18. The structure comprises wheel body portions 19 and 20 on which are mounted tire rims 21 and 22 respectively. On these rims are mounted pneumatic tires 23 and 24, as illustrated. Hub 17 also carries a brake drum 25. Cooperating brake shoes 26, and a backing plate 27 are carried by the axle housing 18. The tire wheel structure as described, represents a conventional dual wheel tire construction and to which the invention has special utility.

The pneumatic tires 23 and 24 are inflated by air pressure from a suitable source by connection of the air pressure line to the valve stems 30 and 31 respectively, and which stems project through the rims of the wheel in the usual manner. For installation of the signal attachment, the valve stem dust caps are omitted for the reception of the air pressure hose of the signal attachment.

Figure 9:
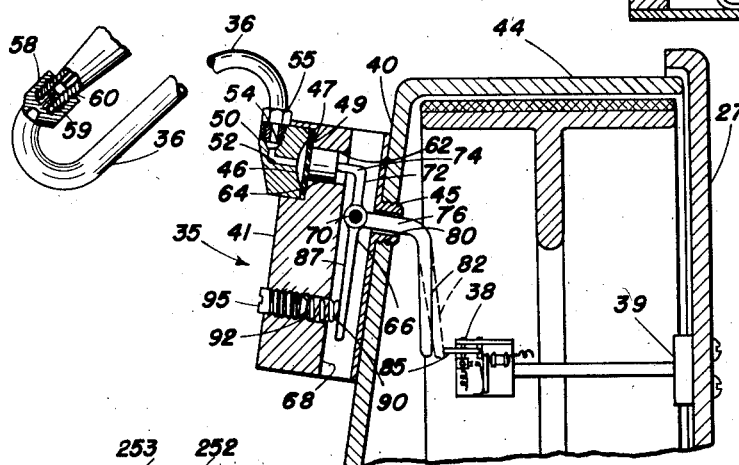
Figure 9 is a fragmentary detailed view in section of the tire wheel structure illustrated in Figure 8, and being shown on enlarged scale.

The signal accessory mechanism of this invention comprises in general a pressure responsive means which is mounted for rotation on the wheel which is in direct communication with the air pressure in the tire, being connected thereto through the valve stem, the pressure responsive means being adapted to close an electrical switch to operate a signal light or audible means when the tire becomes under-inflated. As illustrated in Figures 1, 8 and 9, the pressure responsive means 35 is connected by means of an air pressure hose 36 with the valve stem of the tires. An electrical switch 38, suitably mounted on the stationary cover plate 27, is actuated by the pressure responsive means 35 through suitable lever mechanism. The switch 38 is mounted on the cover or backing plate 27, as by means of a bracket and attaching arm means 39. The signal actuating pressure responsive means 35 is suitably mounted on the wall 40 of the brake drum which rotates with the wheel. In the structure shown in Figure 9, the pressure responsive means comprises an elongated housing portion 41 which is of a size to be accommodated in the space between the wheel body portion 42 and the brake drum 44, the pressure responsive means 35 being suitably secured thereto as by means of a hollow threaded stud 45.

At one end of the housing portion 41 a fluid pressure diaphragm chamber 46 is provided which is equipped with a diaphragm 47 which flexes under varying pressure conditions, the same being suitably clamped in position between the annular shoulder portion 49 and apertured head member 50. Head member 50 is provided with a fluid passageway 52 which communicates with the fluid pressure diaphragm chamber 46, the passageway 52 terminating in an outer threaded cavity portion 54 which is adapted to receive a nipple 55 disposed on the end of the air pressure hose 36. On the other end of the air hose 36 there is mounted an internal threaded nozzle 58 having a valve actuating means 59, which is removably received onto the threaded valve stem 60. When the nozzle 58 is screwed down onto the valve stem 60, air pressure in the tire is placed in communication with the diaphragm chamber 46 on the pressure responsive means 35.

Arranged beneath the diaphragm 47 in the housing 41 is a cylinder 62 equipped with a piston 64. This piston is maintained yieldably pressed against the underside of diaphragm 47 by a bellcrank lever 66. Lever 66 is pivotally secured in the housing opening 68, being pivoted as at 70. The bellcrank 66 comprises an arm 72 having an integral L-shaped end portion 74 which extends into the cylinder 62 and is adapted to yieldably press piston 64 against the diaphragm 47, as illustrated in Figure 9. A second integral arm 76 extends through the opening 80 in the wall 40 of the brake drum inside the hollow threaded stud 45 and in position to actuate the switch 38. For this purpose an extension 82 is provided which is adapted to be moved into and out of the path of the switch actuating lever 85, as shown in the dotted lines in Figure 9. Pivoting of the bellcrank 66 in response to deflation of the tire is thus brought about by actuation of the pressure responsive means 35 to trip the switch arm 85 and close electrical contacts to the signal light.

To adjust the pressure responsive means 35 for operation under a predetermined tire pressure condition, for example, as required for low pressure or high pressure tire operation, a third arm 87 is provided on the bellcrank 66 which is yieldably loaded by a coil spring 90, suitably mounted in the threaded cavity 92 of the housing 41, as illustrated in Figure 9. Adjustment of the pressure applied by the coil spring 90 is made by threading up or down of the stud screw 95. In the structure illustrated, it will be seen that when the air pressure in the tire to which the pressure responsive means 35 is connected is lowered to a predetermined point, the bellcrank lever 66 will pivot against the action of the coil spring 90 on lever arm 87 flexing the diaphragm 47 to an extent to allow the arm 82 to move into the path of the switch actuating arm 85 and trip the switch and operate the signal means.

Referring to the switch mechanism 38, in the preferred form, as illustrated in Figures 6 and 7, contacts 100 and 101 arranged in the switch housing 103 are normally retained out of contact by the lever 105 which is pivotally mounted in the switch housing as at 107. Contact 100 is electrically insulated from the housing 103, which is grounded, being suitably mounted in the insulating block 108. Bakelite, or the like plastic, may be used as the insulating block material. Electrical connection to contact 100 and the signal light is made through the post 102 of the block 108, as shown in Figure 6. Lever 105 is equipped with a tension spring 109 to return the lever to its open-switch position, as illustrated in Figure 7. Spring 109 attached to the lever 105 is suitably secured at the other end to the wall of the switch housing 103 and is placed under tension only when the lever 105 is swung to the dotted line position as illustrated in Figure 7. A notched portion 110 on the end of the lever arm 111 is adapted to receive the pin 112 mounted on the bar 115. This pin extends into and is guided in the slot 114 of the wall 116. Bar 115 is spring-tensioned against the wall 117 by a U-shaped leaf spring 119 which carries the arm 121 on the end of which is mounted the contact switch point 101. Spring means 119 urges the bar 115 in a direction tending to close the switch contacts 100 and 101, being prevented from closing the same when the lever 105 is in the position shown in Figure 7.

The bar 115 functions as an armature and is drawn against the action of the spring 119 by the solenoid 125 thus opening the switch contacts 100 and 101 to permit resetting of the signal mechanism. Energizing of the solenoid, which is electrically connected to the battery system of the car, as through line 126 and ground 127, causes the armature 115 to be moved to break contacts 100 and 101 and permit lever 105 to swing back to its normal position and lock open the switch contacts. The solenoid 125 thus makes it easy to reset the mechanism merely by closing a switch mounted on the instrument panel of the car.

The pressure responsive means illustrated in Figures 3, 4 and 5, which is especially useful on dual tire wheel mountings, comprises a casing 131 having the bellcrank levers 132 and 133 arranged therein. The bellcranks comprise similar shaped engaging lever arms 134 and 135 respectively. Both bellcrank levers are pivotally carried by the rod 136 which is mounted in the casing being supported at its opposite ends by the side walls as at 137, as illustrated in Figures 3 and 4. The bellcrank levers 132 and 133 are independently actuated by the diaphragm 140 acting on the pistons 142 and 144. Piston 142 actuates lever arm 134 and piston 144 actuates lever arm 135. The diaphragm 140 is provided with dual chambers 145 and 146, as shown in Figure 5. Adjustable loading of the bellcranks 132 and 133 is obtained by the coil springs 162 and 164 which are adjustable to increase or decrease the spring load tension applied. For this purpose use is made of the screw means 166 and 167 respectively, as shown in Figure 4. Operation of the pressure responsive means is illustrated in Figures 3, 4 and 5, and is the same as in the single chamber pressure responsive means shown in Figure 9 and heretofore described.

Figure 11:
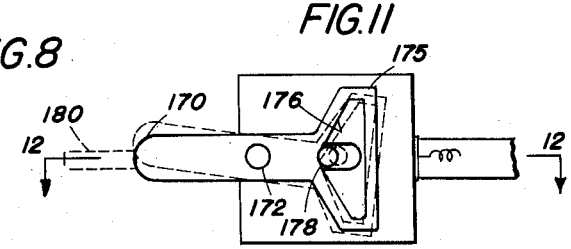
Figure 11 is a plan view of a modified switch mechanism for operating the signal light.
Figure 12:
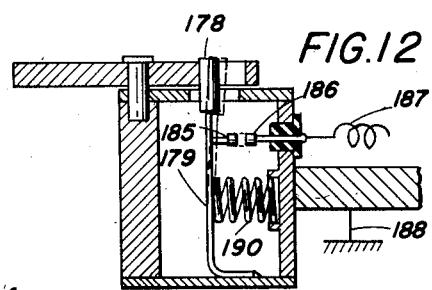
Figure 12 is a sectional view taken substantially on the line 12—12 of Figure 11 and looking in the direction of the arrows.

In the modified switch structure illustrated in Figures 11 and 12, a toggle type switch actuating lever 170 is utilized. Lever 170 consists of a T-shaped member pivoted as at 172 and provided with an apertured T-shaped head 175. The inner surface 176 of the apertured head portion serves as a cam track for a switch operating pin 178 which is carried on the spring bar 179. Swinging of the lever 170 by the lever 180 of the coacting pressure responsive means, as shown in dotted lines, causes the switch actuating lever 170 to move to the dotted line position shown in Figure 11. This brings about closure of the contacts 185 and 186 and energizing of the signal means, such as a light, connected in the circuit of lines 187 and ground 188 and mounted on the instrument panel of the vehicle. A coil spring 190 normally maintains the switch contacts 185 and 186 open during proper inflation of the tire. A flashing signal is obtained using the toggle type switch illustrated in Figures 11 and 12.

When employing the modified switch structure shown in Figures 11 and 12, the solenoid such as employed in the preferred switch structure illustrated in Figures 6 and 9, reference character 125, is omitted. In the toggle switch modification, the signal lights will be automatically reset and a flashing light produced as a tire becomes deflated sufficiently to cause the pressure responsive means 35 to bring about closure of the switch, for example 170 as shown in Figure 11, and swing the lever 170 about its pivot 172 and cause the switch contacts 185 and 186 to be momentarily closed as the contact arm 180 passes by as the wheel turns. Where it is desired that the signal light be changed from a flashing signal to one where the light stays on for a longer duration or continuously, a holding switch may be inserted in the line or a condenser to provide a signal of the desired duration.

In Figure 2 a modified pressure responsive means is illustrated, of the cylindrical type, and which comprises a housing 200 and piston cylinder means 202 which is equipped with a diaphragm 204 for actuation under low pressure conditions of a tire connected thereto. Piston means 206 is arranged to reciprocate in the cylinder 202 and is normally maintained pressed against the diaphragm by the coil spring 208. An annular-shaped air chamber 210 is provided beneath the diaphragm 204 and communicates with an air pressure intake passageway 212 which is connected to a valve stem of the tire to be guarded by the signal warning system of this invention. In this modification when the air pressure in the tire is under inflated, the diaphragm 204 is flexed under the action of the spring 208 moving the connecting rod 215 to a position, as indicated in the dotted line in Figure 2, whereby the switch lever 218 is actuated. Tripping of the switch lever 218 closes contacts of the switch which sets the signal light.

Figure 10:
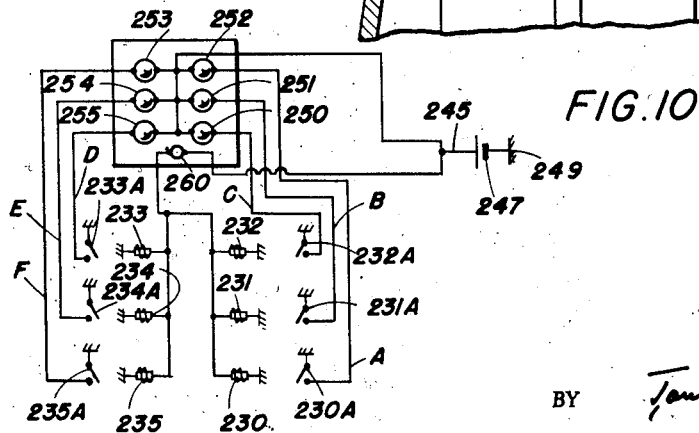
Figure 10 is a schematic view of the electrical system used in the signal mechanism.

In Figure 10 there is illustrated a layout of the electrical diagram of the signal system for a vehicle having six wheels, either single or dual. Solenoids 230, 231, 232, 233, 234 and 235 correspond to means 125 of the preferred switch mechanism. Each of these solenoid means is provided with coacting electrical switch contact means as at 230a, 231a, 232a, 233a, 234a and 235a which control circuits a, b, c, d, e, and f. Power for operating the signal and resetting means is made through line 245 and battery 247. Signal lights, as shown at 250, 251, 252, 253, 254 and 255 are connected to the line 245, the lights being mounted on the instrument panel of the vehicle.

As will be seen, the closing of either one or more of the switches by actuation of the corresponding pressure responsive means operates to electrically connect a light signal corresponding to the tire circuit which has been closed. Resetting of the panel of signal lights is suitably accomplished by merely pushing switch button 260. This switch 260 operates to close an electrical circuit through the solenoids, as shown at 125 for example, of the switch mechanisms which are mounted on the tire wheel backing plates. Utilizing the switch mechanism as illustrated in Figures 6, 7, 8, 9 and 10, the switch points are caused to be locked open for normal operation.

The invention, accordingly, provides a warning signal mechanism for motor vehicles, and which operates as a guard against the continued running of tires in an under-inflated condition. This signal mechanism is adapted for installation on conventional motor vehicles, aircraft and the like which utilize pneumatic tires. In the preferred embodiment of the invention, the signal means consists of an electrically operated light arranged on the instrument panel of the vehicle, however, if desired, the signal means may comprise an audible means, e. g. an electrically actuated buzzer or a combination of light and sound alarm means.

While the invention has been illustrated and described in detail, the same is to be considered as illustrative of how the invention may be used but is not restrictive thereof. The several modifications illustrated and described herein, as well as others which will readily occur to those skilled in the art and utilizing the basic principles of this invention, are considered to be within the broad scope of this invention, reference being had to the appended claims.

What is claimed is:

1. A signalling mechanism for indicating under-inflation of dual mounted pneumatic tires on a vehicle, which comprises in combination with a vehicle equipped with dual mounted pneumatic tires, and an electrical circuit including a storage battery; of a pressure responsive means mounted for rotation with said pneumatic tires and in communication with the air pressure chamber of the tires, electrically operated signal means mounted on the vehicle and connected for operation in said electrical circuit, said pressure responsive means comprising a plurality of pressure actuated bellcrank levers arranged for independent operation, and a switch in said circuit which is normally held in open-circuit position, said switch being closed by actuation of said pressure actuated bellcrank levers to operate said signal means when the air pressure in either tire reaches a predetermined low point, and means for re-setting said switch in open position.

2. A signalling mechanism for indicating under-inflation of a pneumatic tire on a vehicle which comprises in combination with a vehicle equipped with pneumatic tires and an electrical circuit including a storage battery of a pressure responsive means mounted for rotation with a pneumatic tire and in communication with the air pressure chamber of the tire, said pressure responsive means comprising a plurality of pressure actuated diaphragm equipped chambers for independent operation, electrically operated signal means mounted on the vehicle and connected for operation in said electrical circuit, and a switch in said circuit which is normally open, said switch being normally held in open-circuit position while urged to closed-circuit position, said switch being closed by actuation of said pressure responsive means to operate said signal means when the air pressure in the tire reaches a predetermined low point, and electrically operable solenoid means arranged on the vehicle in the proximity of said signal means for resetting said switch in open position.

3. In combination with a vehicle comprising wheels equipped with pneumatic tires, and an electrical circuit including a source of electricity, of a warning signal means arranged on the instrument panel of said vehicle and operated by said source of electricity when any one of the pneumatic tires on the vehicle becomes under-inflated, said signal means including a pressure responsive means comprising a pressure actuated bellcrank lever mounted for rotation with the tire and a coacting switch means fixedly mounted adjacent to said tire and operated thereby, said switch comprising switch contact means normally urged in closed circuit position, means for holding said switch contact means in open-circuit position and a solenoid actuated means for resetting said switch to its switch-open position after being operated by action of said pressure responsive means.

4. In signalling mechanism for indicating under-inflation of one or more pneumatic tires on a plural-tire wheel mounting, said mechanism comprising a pressure responsive means mounted on said wheel equipped with a plurality of pneumatic tires and adapted to turn therewith, conduit means carried by said wheel and connecting each of said tires with said pressure responsive means, said pressure responsive means comprising a plurality of fluid pressure chambers equipped with a flexible diaphragm, said last-mentioned chambers corresponding with the number of tires on said wheel and communicating respectively therewith, electrically operated signal means in an electrical circuit and including a switch for closing the electrical circuit to said signal means, said switch being fixedly mounted adjacent to said wheel and arranged for actuation by said pressure responsive means to operate said signal means when the air pressure in the tire reaches a predetermined low point, said switch means comprising a trip lever which is normally locked in open-circuit position and upon being tripped urged to closed-circuit position, and solenoid operated means for resetting said trip lever to open-circuit position.

5. A signalling mechanism for indicating under inflation of a pneumatic tire on a vehicle which comprises in combination with a vehicle equipped with pneumatic tires, an electrical circuit and source of electricity, signal means in said electrical circuit, a switch in said electrical circuit which is normally open, said switch being normally held in open-circuit position while urged to closed circuit position, pressure responsive means mounted for rotation with said pneumatic tire and in communication with the air chamber of the tire, said pressure responsive means being arranged to close said switch when the pressure in said tire reaches a predetermined low, and electrically operated means arranged on said vehicle in the proximity of said signal means for re-setting said switch in open position.

References Cited in the file of this patent

UNITED STATES PATENTS

| | | |
|---|---|---|
| 1,324,915 | McKee | Dec. 16, 1919 |
| 2,445,959 | Luper | July 27, 1948 |
| 2,463,335 | Warnshuis | Mar. 1, 1949 |
| 2,710,391 | Trinca | June 7, 1955 |

FOREIGN PATENTS

| | | |
|---|---|---|
| 597,291 | Great Britain | Aug. 13, 1945 |